United States Patent
Liu et al.

(10) Patent No.: US 12,324,449 B2
(45) Date of Patent: Jun. 10, 2025

(54) PREPARATION METHOD FOR CONVENIENT AND INSTANT DUMPLING WITH LONG NORMAL-TEMPERATURE SHELF LIFE

(71) Applicant: China Agricultural University, Beijing (CN)

(72) Inventors: Siyuan Liu, Beijing (CN); Ju Qiu, Beijing (CN); Yinhua Zhu, Beijing (CN); Juan Chen, Beijing (CN); Rong Liu, Beijing (CN); Bing Fang, Beijing (CN); Jiaqiang Huang, Beijing (CN); Yao Hu, Beijing (CN); Ran Wang, Beijing (CN)

(73) Assignee: China Agricultural University, Beijing (CN)

( * ) Notice: Subject to any disclaimer, the term of this patent is extended or adjusted under 35 U.S.C. 154(b) by 0 days.

(21) Appl. No.: 18/610,291

(22) Filed: Mar. 20, 2024

(65) Prior Publication Data
US 2024/0315292 A1  Sep. 26, 2024

(30) Foreign Application Priority Data
Mar. 20, 2023  (CN) .......................... 202310265830.6

(51) Int. Cl.
| | |
|---|---|
| *A23L 13/40* | (2023.01) |
| *A21D 2/02* | (2006.01) |
| *A21D 8/02* | (2006.01) |
| *A23B 2/30* | (2025.01) |
| *A23L 5/10* | (2016.01) |
| *A23L 27/14* | (2016.01) |

(52) U.S. Cl.
CPC .............. *A23L 13/426* (2016.08); *A21D 2/02* (2013.01); *A21D 8/02* (2013.01); *A23B 2/30* (2025.01); *A23L 5/11* (2016.08); *A23L 5/13* (2016.08); *A23L 27/14* (2016.08)

(58) Field of Classification Search
CPC .................................. A23L 33/21; A23L 2/52
USPC .................................................... 426/2, 657
See application file for complete search history.

(56) References Cited

FOREIGN PATENT DOCUMENTS

| CN | 1105530 A | 7/1995 |
|---|---|---|
| CN | 1108890 A | 9/1995 |
| CN | 1133143 A | 10/1996 |
| CN | 1164361 A | 11/1997 |
| CN | 101371688 A | 2/2009 |
| CN | 111328975 A | 6/2020 |
| CN | 111789226 A | 10/2020 |

*Primary Examiner* — Nikki H. Dees
*Assistant Examiner* — Philip A Dubois

(57) ABSTRACT

A preparation method for a convenient and instant dumpling with a long normal-temperature shelf life includes the following steps: preparation of dough→pressing of dough wrapper→preparation of dumpling wrapper→preparation of stuffing→kneading of dumpling→pre-cooking→canning→sterilization and finished product. By improvement processes in the angle of dough wrapper, stuffing, water migration, dough wrapper adhesion, and taste preservation, the product performance is improved, so that the product may be stored at the normal temperature for at least 12 months and the taste quality may still maintain the same level as fresh dumplings.

10 Claims, 9 Drawing Sheets

PREPARATION METHOD FOR CONVENIENT AND INSTANT DUMPLING WITH LONG NORMAL-TEMPERATURE SHELF LIFE

CROSS REFERENCE TO THE RELATED APPLICATIONS

This application is based upon and claims priority to Chinese Patent Application No. 202310265830.6, filed on Mar. 20, 2023, the entire contents of which are incorporated herein by reference.

TECHNICAL FIELD

The present disclosure relates to the field of food processing, in particular to a preparation method for a convenient and instant dumpling with a long normal-temperature shelf life.

BACKGROUND

Dumplings are a kind of traditional Chinese food, stuffing is wrapped with dough wrappers, and they are shaped like half-moon or shoe-shaped gold ingots. The wrapped dumplings may be used to make steamed dumplings, fried dumplings or soup dumplings. The dumplings are a kind of staple food and local food in northern China, as well as a festive food, often endowed with special meanings.

However, under special environmental conditions such as border defense and aerospace, there are no conditions for making the dumplings, so it may only be prepared by prefabrication methods and stored for a long time. When used, it may be simply cooked by heating and the like and eaten.

CN1108890A discloses a crystal fast food dumpling and a processing method thereof. The dumplings are boiled in boiling water for 12-17 min, vacuum-packaged, and then boiled in boiling water for 4-6 min, after being sterilized, a finished product is obtained. The shelf life of the product may reach 2-3 months. CN1164361A discloses a preparation method for convenient and instant dumpling and Wonton. The dumplings are firstly microwave-cooked, the cooking temperature is controlled at 100-120° C., the time is controlled at 6-10 min, then it is pasteurized, the time is controlled at 10-20 min, and finally vacuum-packaged into a finished product. This method has two drawbacks: (1) the sterilization intensity of the product is not sufficient to kill all microorganisms in the product, and the shelf life of the product is relatively short; and (2) after being vacuum-packaged, the dumplings are prone to breakage and deformation, its sensory characteristics are seriously affected. CN1105530A discloses an instant dumpling and a production process. The dumplings made according to conventional methods are vacuum-packaged in composite material bags (<−0.06 MPa), and then subjected to high-pressure and high-temperature cooking and sterilization (the pressure is 0.07 MPa, the temperature is 115° C., and the time is 20 min), to obtain a finished product. But it needs to be rehydrated when eaten. CN111789226A discloses an instant canned dumpling with soup and a preparation method thereof. The can is packaged with soup and stewed dumplings, herein the dumpling wrapper is a water resistant wrapper mainly made of fibrotic fish maw. The dumplings are soaked in the soup, but the dumpling wrappers may not rot and may not affect the taste of the dumplings. However, since the canned dumplings prepared by this preparation method contain the soup, soaking in a short period of time may not have any impacts. However, if it is stored for too long, such as 2-3 months or more, it may inevitably affect the taste of the dumplings. Moreover, the canned dumplings with the soup are more limited in terms of storage and usage environments, and need to be handled with care. The storage conditions are also relatively strict. The dumplings stored in the normal temperature and sealed environment may become sticky and soft in texture, sticking together and easily breaking, so that it may not be taken completely. In addition, with the extension of the storage time, the degree of starch aging may further lead to the fission of the dumplings, and the dumplings are prone to rot and deterioration.

Therefore, in response to problems in existing technologies, the present disclosure urgently needs to clarify the mechanism of quality deterioration during the process of canned dumpling storage, and optimize raw materials and processes, so that the dumplings may be stored at the normal temperature for 12 months, and its quality may still maintain the same level as fresh dumplings, and the dumplings may be eaten in the specific environments, to meet some specific customization needs. This product adds waxy corn starch and sodium tripolyphosphate to the formula, uses a multi-level rolling technology to make the dumpling wrappers, and fries the dumpling stuffing. The product, which is packaged in an aluminum alloy can and pre-cooked and sterilized at the high temperature, may be stored at the normal temperature and eaten immediately after the can is opened. Compared with frozen dumplings, it does not require cold chain transportation and low-temperature storage, the convenience degree is improved. With the explosive growth of the convenience food market, this product caters to people's living needs and has a broad market prospect.

SUMMARY

A purpose of the present disclosure is to provide a preparation method for a convenient and instant dumpling with a long normal-temperature shelf life. By improvement processes in the angle of dough wrapper, stuffing, water migration, dough wrapper adhesion, and taste preservation, the product performance is improved, so that the product may be stored at the normal temperature for at least 12 months and the taste quality may still maintain the same level as fresh dumplings.

The preparation method includes the following steps: preparation of dough→pressing of dough wrapper→preparation of dumpling wrapper→preparation of stuffing→kneading of dumpling→pre-cooking→canning→sterilization and finished product. This method adds waxy corn starch and sodium tripolyphosphate to the dumpling wrapper formula, uses a multi-level rolling technology to make the dumpling wrapper, and fries dumpling stuffing. The hardness of the dumpling wrapper after frying the stuffing is higher than that of non-fried stuffing, it is beneficial to maintain the integrity of the dumpling, and the fried dumpling stuffing may improve the structural stability of the dumpling wrapper during storage. Before canning, the dumplings are pre-cook for 1-2 min, the pre-cooking degree is approximately 50%-60%, and after being pre-cooked, the dumplings are poured in cold water. The purpose is that the pre-cooked dumplings are convenient for shaping and canning, and sticking between the dumplings is avoided. The product, which is packaged in a metal can and pre-cooked and sterilized at the high temperature, may be stored at the normal temperature and eaten immediately after the can is opened. Compared with frozen dumplings, it does not require cold chain transportation and is stored at the normal temperature, the convenience degree is improved.

The purpose of the present invention is achieved through the following technical solutions:

A preparation method for a convenient and instant dumpling with a long normal-temperature shelf life, the preparation method includes the following steps:

(1) preparation of dough: weighing flour and waxy starch, mixing uniformly, adding a mixture of sodium tripolyphosphate and salt water, kneading into a dough, sealing and awakening the dough, wherein the weight ratio of flour:waxy starch:sodium tripolyphosphate:salt is (100-120):(5-10):(0.3-0.6):(1-3);

(2) pressing of dough wrapper: pressing the awakened dough into a dough wrapper with a thickness of 1.2-2.5 mm by a dough press;

(3) preparation of dumpling wrapper: using a mold to carve out a dumpling wrapper with a required size for later use;

(4) preparation of stuffing: mincing meat required into minced meat, washing and treating a vegetable required, cutting and mixing slightly, after being mixing uniformly, mixing auxiliary materials required with it, kneading into an oval meat ball, frying in 110-140° C. oil for 20-40 s, and draining the oil for later use;

(5) kneading of dumpling: wrapping the dumpling stuffing with the dumpling wrapper to prepare a dumpling;

(6) pre-cooking: pre-cooking the dumplings for 1-2 min, wherein the pre-cooking degree is 50%-60%, and after being pre-cooked, pouring the dumplings in cold water;

(7) canning: putting the dumplings into a metal can; and (8) sterilization and finished product: exhausting steam from a sample, sealing the can, and sterilizing to obtain a finished product.

Further, the flour is wheat flour.

Further, the meat for preparing the stuffing is any one of pig lean meat, streaky meat, beef, mutton or fish; and the vegetable is any one of day lily, Chinese cabbage, or Chinese chive.

Further, the auxiliary materials required for preparing the stuffing are ginger powder, salt, thirteen-spice, shallot and chicken essence.

Further, in Step 7: the metal can is an aluminum alloy can or a tinplate can.

Further, in Step 8: after the can passes through an exhaust system, sealing the can, and sterilizing at 121° C.-130° ° C. for 15-25 min to obtain a finished product. Preferably, sterilizing at 121° C.-124° C. for 18-22 min.

The beneficial effects of the present invention are as follows.

Compared to instant dumplings prepared by traditional methods, the waxy starch used in the present disclosure may replace some wheat flour, reduce the degree of starch aging, and improve the storage structure characteristics of dumpling wrappers, and the dumplings may be stored at the normal temperature for 12 months, and the storage shelf life at the normal temperature is longer; fried dumpling stuffing and the addition of sodium tripolyphosphate may significantly improve the structural stability of the dumplings during storage; in addition, the preparation process of this method is simple, and the dumplings are semi-cooked and subjected to steam exhaust, can sealing, and sterilization without the need for freeze-drying; and the prepared canned dumplings do not require outer self-heating packaging, it is convenient to carry and transport, and the production cost is reduced, which may more conveniently meet consumer needs for product flavor and efficacy.

BRIEF DESCRIPTION OF THE DRAWINGS

FIG. 9A: machine pressed wrapper+frying+waxy starch+sodium tripolyphosphate, FIG. 9B: machine pressed wrapper+frying+waxy starch+no sodium tripolyphosphate, FIG. 9C: machine pressed wrapper+frying+no waxy starch+sodium tripolyphosphate, and FIG. 9D: machine pressed wrapper+non-frying+waxy starch+sodium tripolyphosphate. The magnification times are 200×, 500×, and 1000× respectively.

FIG. 10A: machine pressed wrapper+frying+waxy starch+sodium tripolyphosphate, FIG. 10B: machine pressed wrapper+frying+waxy starch+no sodium tripolyphosphate, FIG. 10C: machine pressed wrapper+frying+no waxy starch+sodium tripolyphosphate, and FIG. 10D: machine pressed wrapper+non-frying+waxy starch+sodium tripolyphosphate.

DETAILED DESCRIPTION OF THE EMBODIMENTS

Figure 1:
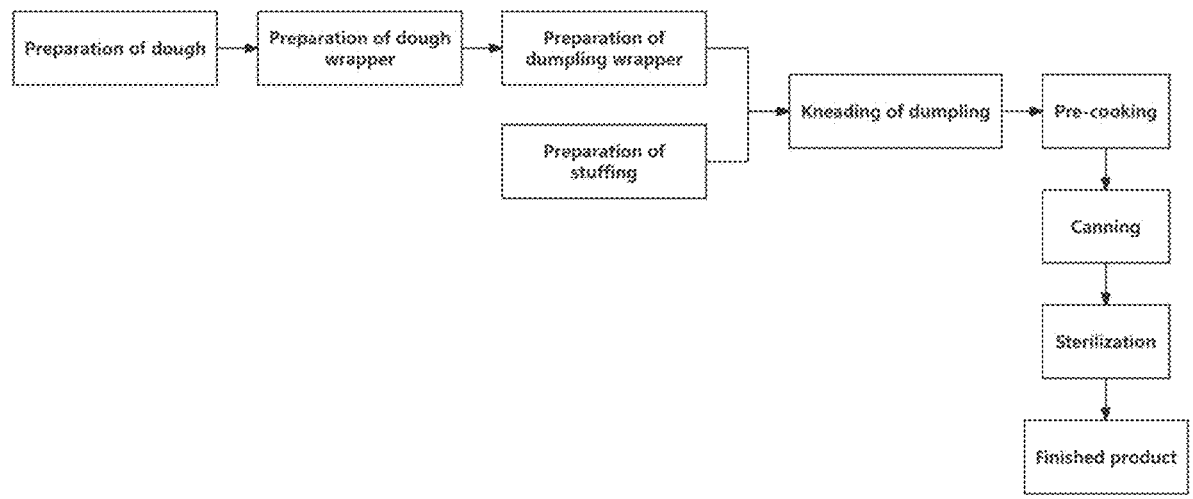
FIG. 1 shows a flow diagram of a dumpling process.

The following will provide a further detailed explanation of the present invention in conjunction with embodiments, but the embodiments of the present invention are not limited to this.

An analysis method for detecting the texture of dumpling wrappers in the present application is: to measure the texture of a boiled and cooled dumpling wrapper at a normal temperature, and cut the dumpling wrapper into 30 mm*30 mm blocks. A texture analyzer of FTC Company is used for measurement, a 20 mm cylindrical probe is selected, to analyze the texture characteristics of the dumpling wrapper, and 3 parallel copies are made for each sample.

Test Parameter:

Test mode: TPA-100N Test speed: 60 mm/min

Trigger force: 0.5 N Compression ratio: 50%

Compression count: 2 times.

Embodiment 1: Preparation Method for Pork and Day Lily Stuffing

Preparation of Dumpling Wrapper:

1. Weighing: 108.4 g of wheat flour and 5.9 g of waxy starch are weighed in proportion, and mixed uniformly. 0.5 g of sodium tripolyphosphate and 1.6 g of salt are weighed, and dissolved in 51.6 g of water at 60° C.

2. Kneading of dough: water is poured into mixed flour, it is stirred while pouring, and kneaded into a dough.

3. Awakening of dough: the dough is sealed and stilly placed at a room temperature to awaken the dough.

4. Pressing of dough wrapper: after the dough is awakened, a dough press is used to press, and firstly, the dough wrapper is pressed smooth by using the first gear, then pressed twice by using the third gear, and pressed once by using the fourth gear.

5. Preparation of dumpling wrapper: a mold is used to carve out a dumpling wrapper with a desired size.

Preparation of Dumpling Stuffing:

1. Pre-treatment: day lily is washed thoroughly, soaked for more than 2 h, and cooked for 20 min, water is squeezed out, and it is cut and mixed lightly for later use by using a cut mixer. Pig lean meat and streaky meat are respectively minced into minced meat for later use by using a meat mincer. shallot are washed and chopped for later use.

2. Weighing: 85.1 g of day lily, 39.0 g of pig lean meat, and 32.0 g of streaky meat are weighed in proportion. 0.9 g of ginger powder, 1.2 g of salt, 0.3 g of thirteen spice, and 0.6 g of chicken essence are weighed and added into a bowl for later use. 1.5 g of shallot is weighed for later use.

3. Mixing uniformly: the day lily is mixed with the pig lean meat and streaky meat uniformly, the auxiliary materials are poured into the bowl and stirred uniformly, the shallot are put in and continuously stirred uniformly.

4. Ball making: the uniformly mixed dumpling stuffing is kneaded into an oval shape for later use.

5. Frying: balls are put into 120° C. oil, fried for 30 s, and removed and the oil is drained.

Preparation of Dumpling:

1. Kneading of dumpling: the dumpling wrapper and the stuffing are kneaded together.

2. Pre-cooking: the dumplings are pre-cooked for 1 min.

3. Canning: the dumplings are put into a tinplate can.

4. Sterilization and finished product: after the can passes through an exhaust system, the can is sealed, and sterilized at 121° C. for 20 min, to obtain a finished product.

Embodiment 2: Preparation Method for Pork and Chinese Cabbage Stuffing

Preparation of Dumpling Wrapper:

1. Weighing: 108.4 g of wheat flour and 5.9 g of waxy starch are weighed in proportion, and mixed uniformly. 0.5 g of sodium tripolyphosphate and 1.6 g of salt are weighed, and dissolved in 51.6 g of water at 60° C.

2. Kneading of dough: water is poured into mixed flour, it is stirred while pouring, and kneaded into a dough.

3. Awakening of dough: the dough is sealed and stilly placed at a room temperature to awaken the dough.

4. Pressing of dough wrapper: after the dough is awakened, a dough press is used to press, and firstly, the dough wrapper is pressed smooth by using the first gear, then pressed twice by using the third gear, and pressed once by using the fourth gear.

5. Preparation of dumpling wrapper: a mold is used to carve out a dumpling wrapper with a desired size.

Preparation of Dumpling Stuffing:

1. Pre-treatment: Chinese cabbage is washed thoroughly, the top and leaves of the Chinese cabbage are cut separately, cooked until soft, water is squeezed out, it is cut and mixed lightly, and the water is squeezed out again with gauze. Pig lean meat and streaky meat are respectively minced into minced meat for later use by using a meat mincer. shallot are washed and chopped for later use.

2. Weighing: 92.3 g of Chinese cabbage, 38.0 g of pig lean meat, and 25.0 g of streaky meat are weighed in proportion. 0.9 g of ginger powder, 1.6 g of salt, 0.3 g of thirteen spice, and 0.6 g of chicken essence are weighed and added into a bowl for later use. 1.5 g of shallot is weighed for later use.

3. Mixing uniformly: the Chinese cabbage is mixed with the pig lean meat and streaky meat uniformly, the auxiliary materials are poured into the bowl and stirred uniformly, the shallot are put in and continuously stirred uniformly.

4. Ball making: the uniformly mixed dumpling stuffing is kneaded into an oval shape for later use.

5. Frying: balls are put into 120° C. oil, fried for 30 s, and removed and the oil is drained.

Preparation of Dumpling:

1. Kneading of dumpling: the dumpling wrapper and the stuffing are kneaded together.

2. Pre-cooking: the dumplings are pre-cooked for 1 min.

3. Canning: the dumplings are put into a tinplate can.

4. Sterilization and finished product: after the can passes through an exhaust system, the can is sealed, and sterilized at 121° C. for 20 min, to obtain a finished product.

Embodiment 3: Preparation Method for Spanish Mackerel Stuffed Dumpling

Preparation of Dumpling Wrapper:

1. Weighing: 108.4 g of wheat flour and 5.9 g of waxy starch are weighed in proportion, and mixed uniformly. 0.5 g of sodium tripolyphosphate and 1.6 g of salt are weighed, and dissolved in 51.6 g of water at 60° C.

2. Kneading of dough: water is poured into mixed flour, it is stirred while pouring, and kneaded into a dough.

3. Awakening of dough: the dough is sealed and stilly placed at a room temperature to awaken the dough.

4. Pressing of dough wrapper: after the dough is awakened, a dough press is used to press, and firstly, the dough wrapper is pressed smooth by using the first gear, then pressed twice by using the third gear, and pressed once by using the fourth gear.

5. Preparation of dumpling wrapper: a mold is used to carve out a dumpling wrapper with a desired size.

Preparation of Dumpling Stuffing:

1. Pre-treatment: Spanish mackerel is washed thoroughly, and cut and mixed for later use by using a cut mixer. Streaky meat and fat meat are minced into minced meat for later use by using a meat mincer. shallot and Chinese chives are washed and chopped for later use.

2. Weighing: 98.8 g of Spanish mackerel, 32.0 g of streaky meat, and 9.4 g of fat meat are weighed in proportion. 0.9 g of ginger powder, 1.2 g of salt, 0.3 g of thirteen spice, and 0.6 g of chicken essence are weighed and added into a bowl for later use. 1.5 g of shallot and 2.8 g of Chinese chives are weighed for later use.

3. Mixing uniformly: the Chinese cabbage is mixed with the pig lean meat and streaky meat uniformly, the auxiliary materials are poured into the bowl and stirred uniformly, the shallot are put in and continuously stirred uniformly.

4. Ball making: the uniformly mixed dumpling stuffing is kneaded into an oval shape for later use.

5. Frying: balls are put into 120° C. oil, fried for 30 s, and removed and the oil is drained.

Preparation of Dumpling:

1. Kneading of dumpling: the dumpling wrapper and the stuffing are kneaded together.
2. Pre-cooking: the dumplings are pre-cooked for 1 min.
3. Canning: the dumplings are put into a tinplate can.
4. Sterilization and finished product: after the can passes through an exhaust system, the can is sealed, and sterilized at 121° C. for 20 min, to obtain a finished product.

Embodiment 4: Texture Analysis of Improved Flour Dumpling Wrapper (with Waxy Starch Added)

1. Texture analysis: by changing the ratio of wheat flour to waxy starch, an improved dumpling wrapper is prepared, and after being cooked, the cooled dumpling wrapper is placed at a room temperature for texture analysis, to analyze the texture characteristics of the dumpling wrapper, and 3 parallel copies are made for each sample.

2. DSC determination 3 mg of freeze-dried dumpling wrapper powder is weighed and placed in a differential scanning calorimetry (DSC) crucible. It is pressed flat, so that it is spread uniformly in the crucible. 15 μL of ultrapure water is added, a lid is pressed for sealing, and it is stilly placed at the room temperature for more than 2 h. The gelatinization and aging properties of the dumpling wrapper are determined by using a differential scanning calorimeter analyzer. Test parameter: the heating range is 20° C.~95° C., and the heating rate is 5° C./min. The measurement is compared with an empty crucible, nitrogen is used as a carrier gas, the flow rate is 50 mL/min, each group of samples is repeated twice, and the average value is taken.

TABLE 1

Analysis of thermal properties of improved flour dumpling wrapper

| Wheat flour:waxy starch | $T_o$ (° C.) | $T_p$ (° C.) | $T_c$ (° C.) | $\Delta H$ (J/g) | Comprehensive aging rate (%) |
|---|---|---|---|---|---|
| 100:0 | 42.9 ± 1.8 | 49.0 ± 1.0 | 55.4 ± 0.4 | 2.7 ± 0.1 | 62.9 |
| 95:5  | 43.1 ± 0.4 | 48.6 ± 0.7 | 55.0 ± 0.1 | 2.4 ± 0.1 | 52.8 |
| 90:10 | 45.8 ± 0.6 | 50.3 ± 0.1 | 54.7 ± 0.8 | 1.9 ± 0.2 | 39.4 |
| 85:15 | 45.3 ± 1.5 | 50.3 ± 0.4 | 54.5 ± 1.4 | 2.0 ± 0.4 | 37.7 |
| 80:20 | 45.9 ± 1.6 | 49.7 ± 0.9 | 54.2 ± 0.5 | 1.6 ± 0.4 | 29.4 |

$$\text{Comprehensive aging rate} = \frac{\text{Dumpling wrapper } \Delta H}{\text{Raw material flour } \Delta H} \times 100\%$$

Figure 2:
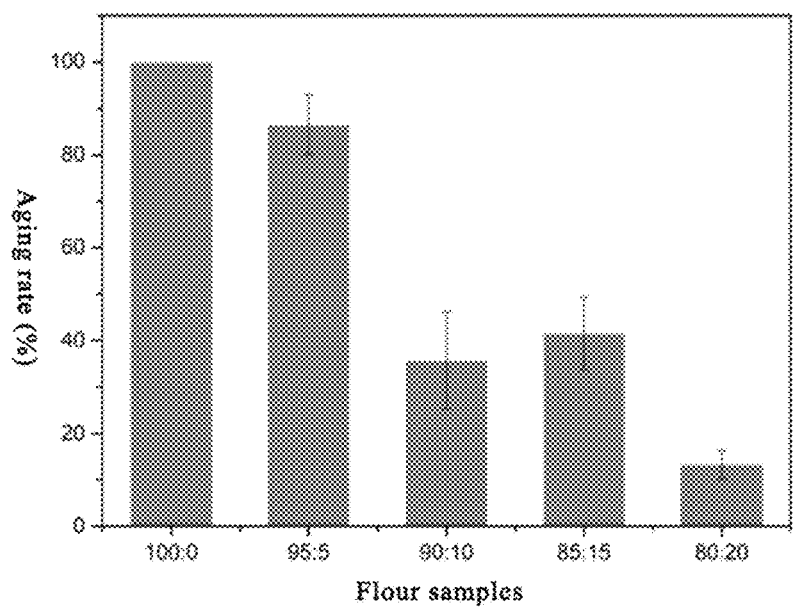
FIG. 2 shows texture analysis of an improved flour dumpling wrapper.

FIG. 2 shows comparison conditions of starch aging rates in flour with different addition ratios of waxy starch. As shown in FIG. 2 and Table 1, wheat flour is replaced with the waxy starch, which may significantly reduce the degree of starch aging in the dumpling wrapper during storage. When the proportion of the waxy starch added is 20%, its irreversible aging rate may be reduced to 13.3%, and the comprehensive aging rate may be reduced from 62.9% to 29.4%. As the addition amount is increased, the hardness of the dumpling wrapper is gradually decreased. The essence of starch aging is that gelatinized starch molecular chains are rearranged from a disordered state, bound together by a hydrogen bond, and transformed into a crystal. The addition of the waxy starch weakens the hydrogen bonding between wheat starch, thereby the degree of aging of the wheat starch during storage is reduced.

Embodiment 5: Texture Analysis of Improved Flour Dumpling Wrapper (Determination of Addition Amount of Sodium Tripolyphosphate)

Texture Analysis:

The fixed addition amount of waxy starch is 5%. By changing the ratio of wheat flour to sodium tripolyphosphate, an improved dumpling wrapper is prepared. After being cooked, the cooled dumpling wrapper is placed at the room temperature for texture determination. The dumpling wrapper is then stored in a refrigerator at 4° C. for accelerated testing, and texture determination is performed at different time points, to analyze the texture characteristics of the dumpling wrapper, and 3 parallel copies are made for each sample.

Figure 3:
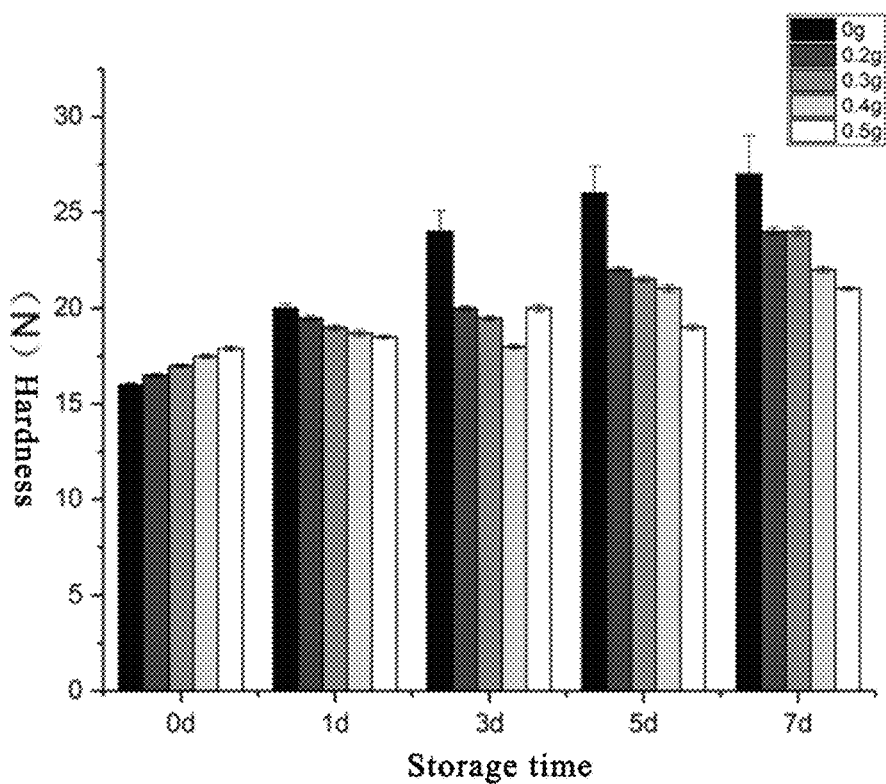
FIG. 3 shows hardness comparison of dumpling wrappers in flour with different addition ratios of sodium tripolyphosphate.

FIG. 3 shows hardness comparison of dumpling wrappers in flour with different addition ratios of sodium tripolyphosphate. As shown in FIG. 3, at 0d, as the addition amount of sodium tripolyphosphate is increased, the hardness of the dumpling wrapper is increased. This is because sodium tripolyphosphate may increase the internal osmotic pressure, so that more water is allowed to enter molecules of starch and gluten proteins, the water absorption and expansion of starch particles and gluten proteins are promoted, to form a better gluten network structure, thereby the hardness of the dumpling wrapper is enhanced. With the extension of storage days, the hardness of the dumpling wrapper without the sodium tripolyphosphate added is rapidly increased due to starch aging. As the addition amount is increased, the increase in the hardness of the dumpling wrapper with 0.5 g of sodium tripolyphosphate added is the least. It is indicated that the addition of sodium tripolyphosphate is helpful to maintain the network structure and maintain the better quality of the dumpling wrapper.

Embodiment 6: Texture Analysis of Improved Flour Dumpling Wrapper (Determination of Addition Amount of Waxy Starch)

Texture Analysis:

The fixed addition amount of sodium tripolyphosphate is 0.5 g. By changing the ratio of wheat flour to waxy starch, an improved dumpling wrapper is prepared. After being cooked, the cooled dumpling wrapper is placed at the room temperature for texture determination. The dumpling wrapper is then stored in a refrigerator at 4° C. for accelerated testing, and texture determination is performed at different time points, and 3 parallel copies are made for each sample.

Figure 4:
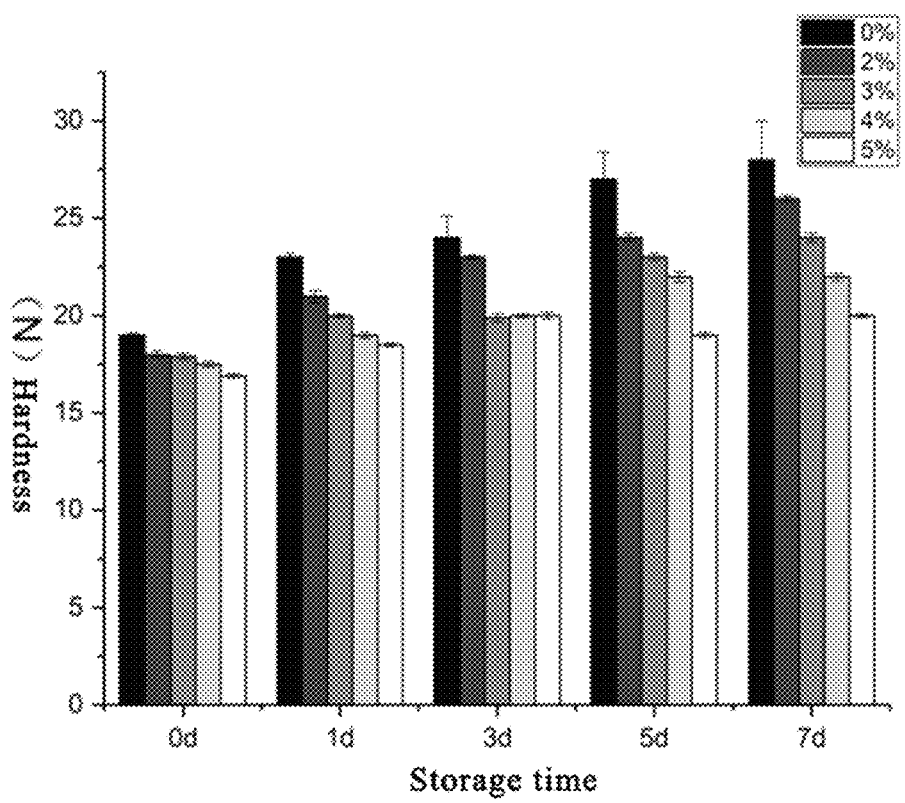
FIG. 4 shows hardness comparison of dumpling wrappers in flour with different addition ratios of waxy starch.

FIG. 4 shows hardness comparison of dumpling wrappers in flour with different addition ratios of waxy starch. As shown in FIG. 4, at 0d, as the addition amount of waxy starch is increased, the hardness of the dumpling wrapper is gradually decreased. Compared to branched starch, linear starch may form a double helix structure faster and faster, as to cause aging. Therefore, the addition of waxy starch reduces the hardness of the dumpling wrapper and the degree of starch aging. As the storage time is prolonged, the hardness of the dumpling wrapper is gradually increased, while the increase in the hardness of the dumpling wrapper with 5% of waxy starch added is the least. If the addition amount continues to increase, adhesion between dumpling wrappers may occur, as to affect storage.

Embodiment 7: Texture Analysis of Dumpling Wrapper with Fried Stuffing

Dumplings with different treatments are taken out according to different storage times, dumpling wrappers are taken for texture analysis, and the texture of the dumpling wrappers is analyzed, and 3 parallel copies are made for each sample.

Figure 5:
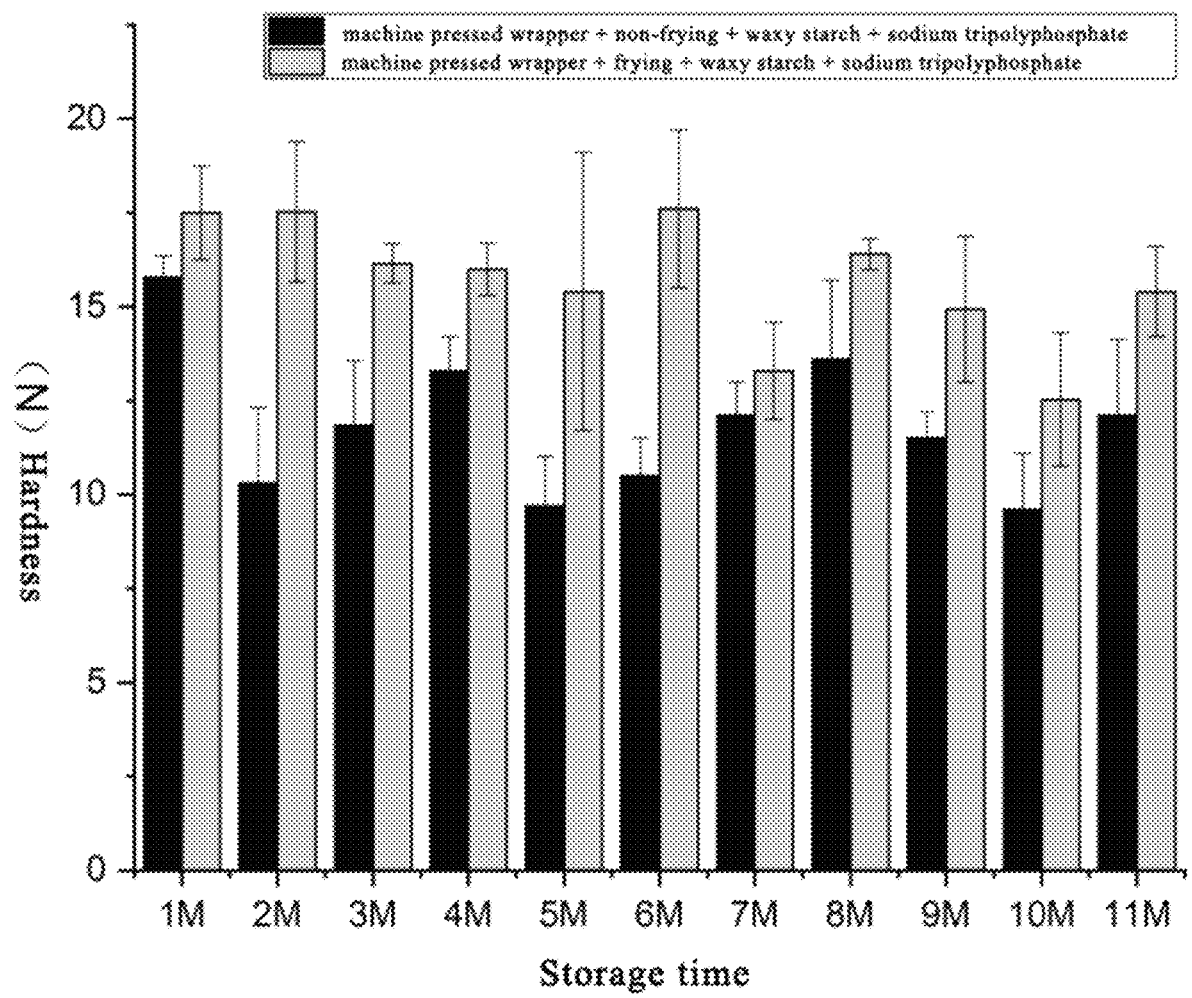
FIG. 5 shows texture analysis of dumplings with or without fried stuffing.

As shown in FIG. 5, the migration of water from stuffing to the dumpling wrapper during storage is a main reason for softness and fragility of the dumpling wrapper. After being fried, the water content of the stuffing stored for 1 month is 53.3%, and it is lower than the water content of non-fried dumpling stuffing, which is 63.1%. This reduces the migration of water from the stuffing to the dumpling wrapper during storage from the source. At the same time, as the storage time is prolonged, the hardness of the dumpling wrapper with non-fried dumpling stuffing is gradually decreased and it becomes thin and soft, which is not beneficial to maintain the integrity of the dumplings during storage. FIG. 5 shows that the hardness of the dumpling wrapper after frying the stuffing is higher than that of non-fried stuffing, this is beneficial to maintain the integrity of the dumplings. Therefore, the fried dumpling stuffing may improve the structural stability of the dumpling wrapper during storage.

Embodiment 8: Texture Analysis of Dumpling Wrapper with Sodium Triphosphate Added in Dough Wrapper Formula Dumplings with different treatments are taken out according to different storage times, dumpling wrappers are taken for texture analysis, and the texture of the dumpling wrappers is analyzed, and 3 parallel copies are made for each sample.

Figure 6:
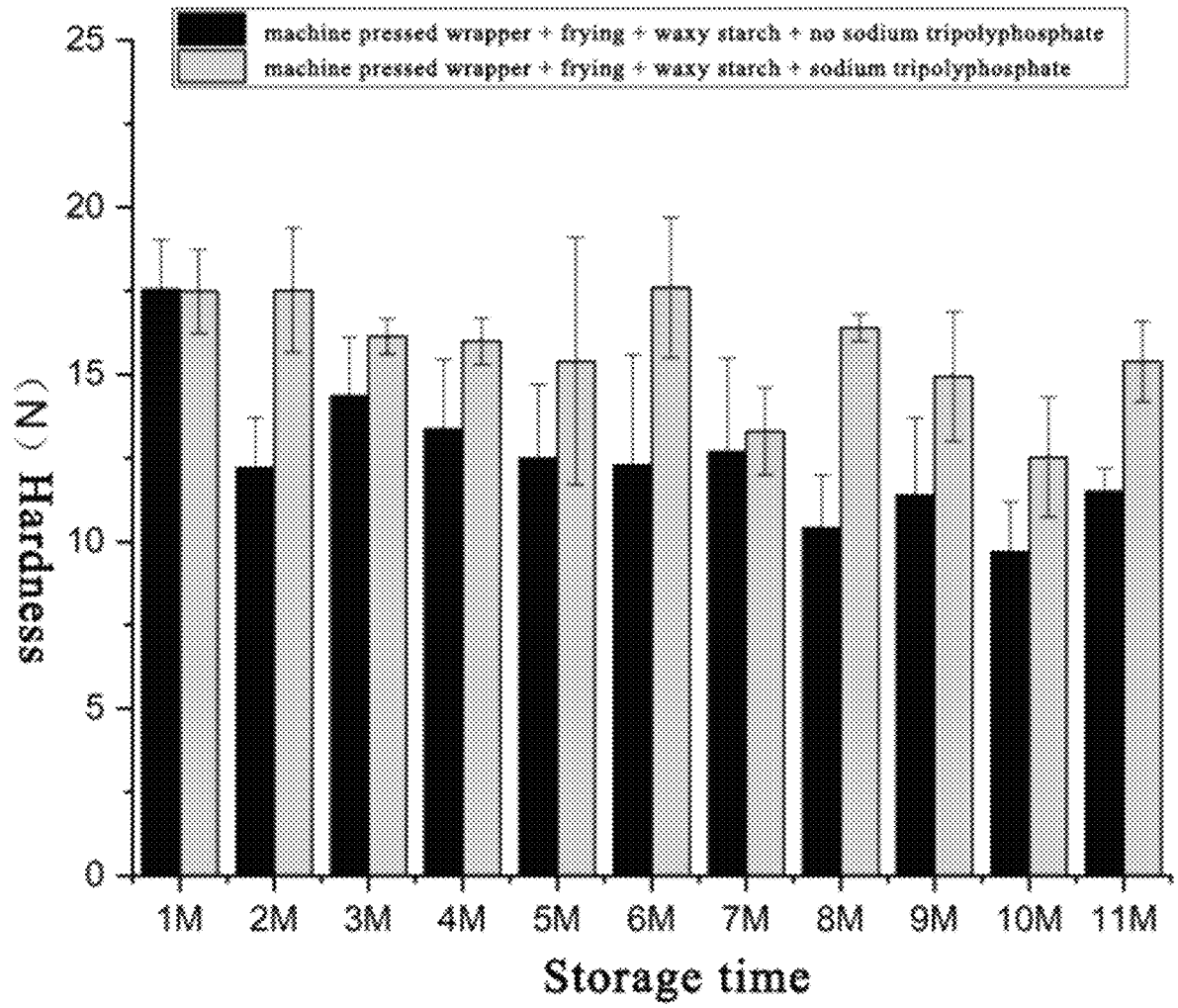
FIG. 6 shows texture analysis of dumpling wrappers with or without the sodium tripolyphosphate added in the formula.

As shown in FIG. 6, sodium tripolyphosphate may promote the binding of protein and starch by esterification, reduce the starch dissolution after being cooked, and promote the mutual binding between starch by a "salt ion bridge", so that the protein-starch network structure is more dense. With the extension of storage time, the hardness of the dumpling wrapper with sodium tripolyphosphate added remains relatively stable, but the hardness of the dumpling wrapper without sodium tripolyphosphate added is decreased, it becomes thin and soft, and it is not beneficial to long-term storage. FIG. 6 shows that the addition of sodium tripolyphosphate may improve the hardness of the dumpling wrapper, which is beneficial to maintain the integrity of the dumplings during storage.

Embodiment 9: Texture Analysis of Dumpling Wrapper with Waxy Starch Added in Formula Dumplings of different treatments are taken out according to different storage times, dumpling wrappers are taken for texture analysis, and 3 parallel copies are made for each sample.

Figure 7:
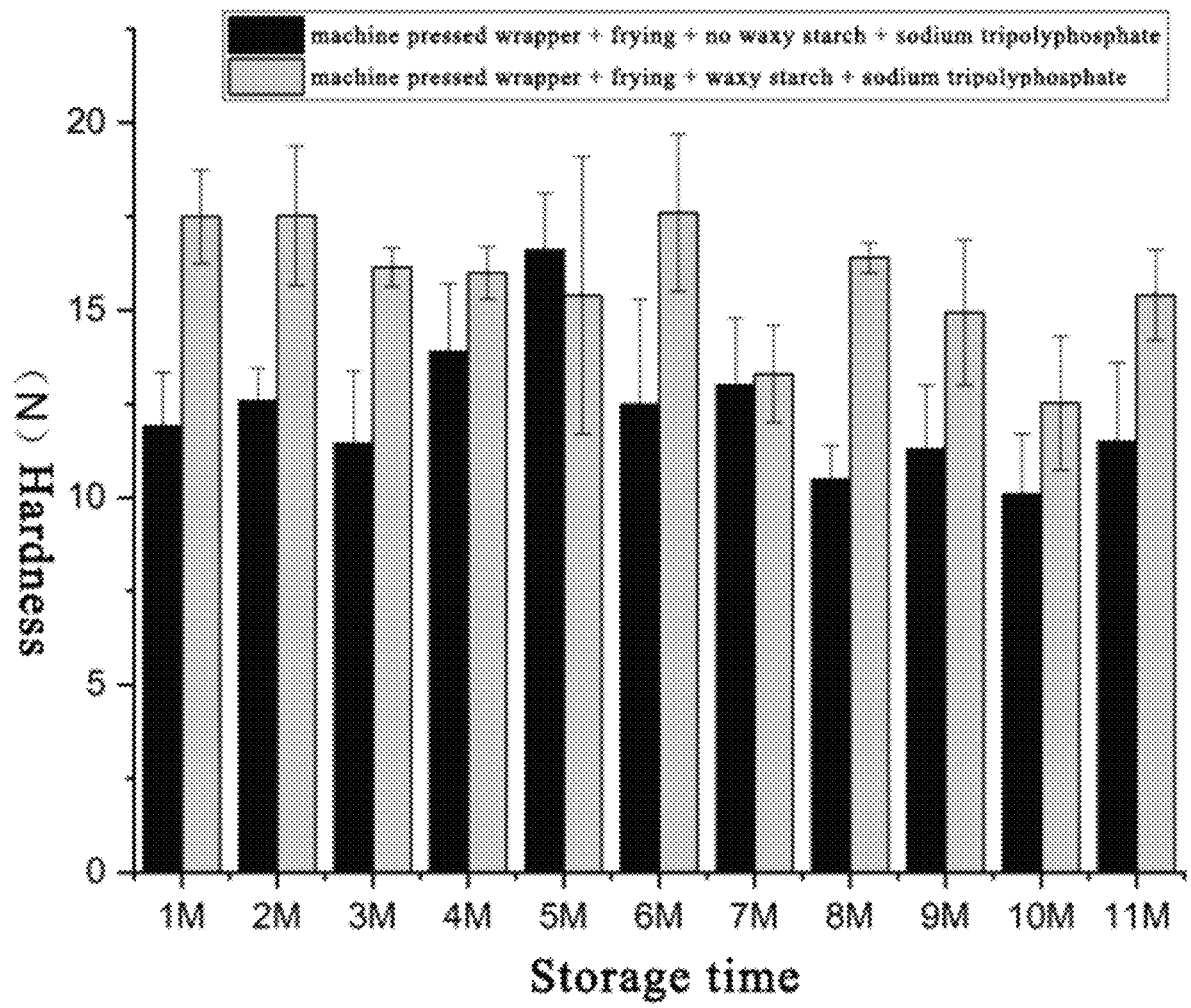
FIG. 7 shows texture analysis of dumpling wrappers with or without the waxy starch added in the formula.

As shown in FIG. 7, wheat starch is replaced with waxy starch, which may significantly reduce the degree of starch aging in the dumpling wrapper during storage. However, the addition of waxy starch during storage has little effect on the hardness of the dumpling wrappers and all remain stable. This may be because the influence of material migration on the hardness of the dumpling wrapper masks the effect of waxy starch on reducing the dumpling wrapper hardness. The hardness of the dumpling wrapper with waxy starch added is greater than that of the dumpling wrapper without waxy starch added, and the network structure of the dumpling wrapper is denser, which is more beneficial to long-term storage. FIG. 7 shows that the addition of waxy starch increases the hardness of the dumpling wrapper during storage, this is beneficial to maintain the integrity of the dumplings during storage. The addition of waxy starch may improve the preservation of the storage structure of the dumpling wrapper.

Embodiment 10: Texture Analysis of Dumpling Wrappers in Different Formulas

Dumplings of different treatments are taken out according to different storage times, dumpling wrappers are taken for texture analysis, and 3 parallel copies are made for each sample.

Figure 8:
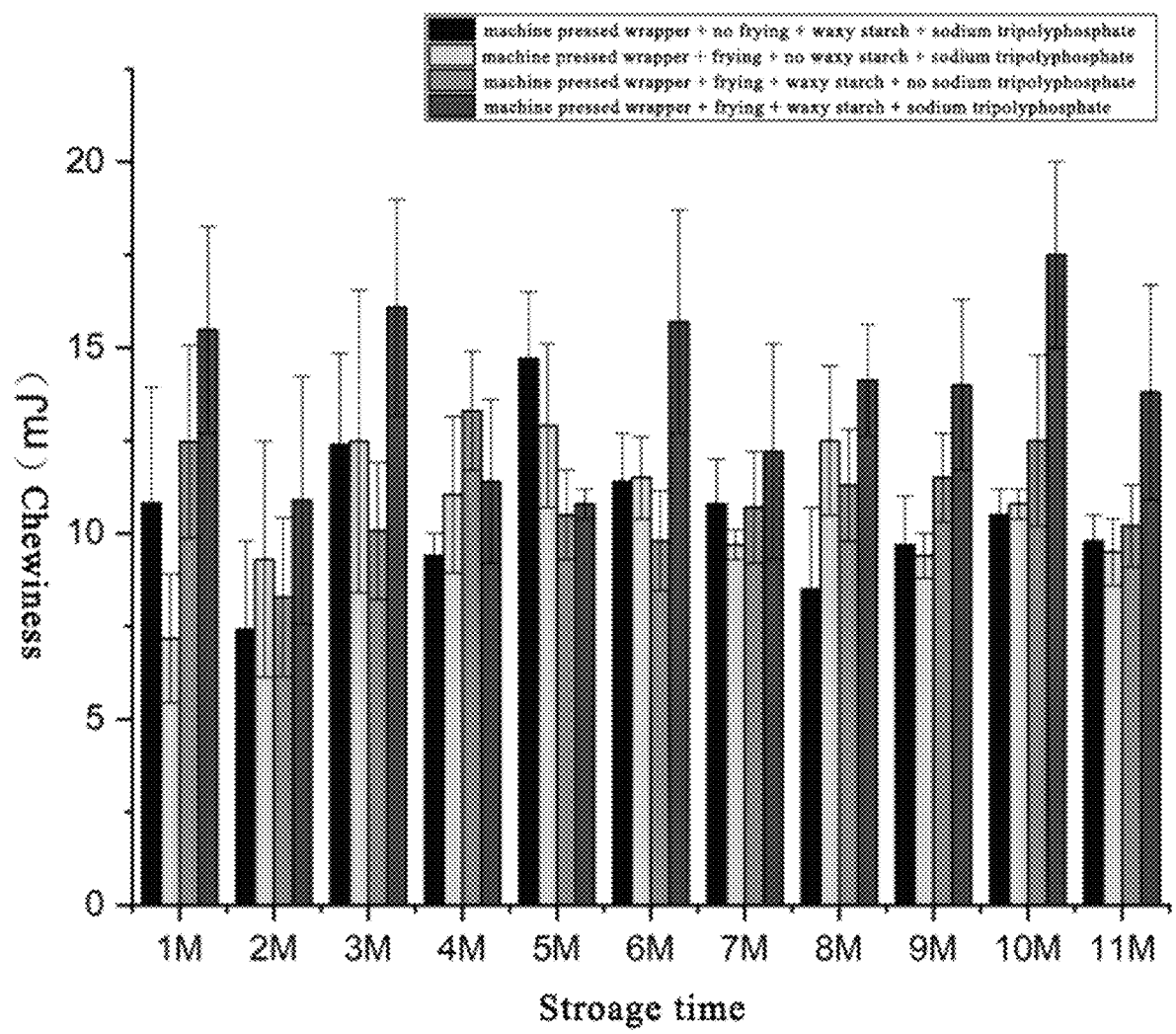
FIG. 8 shows texture analysis of dumpling wrappers in different formulas.

As shown in FIG. 8, the addition of waxy starch and sodium tripolyphosphate, and fried dumpling stuffing may improve the preservation of the storage structure of the dumpling wrapper. After the stuffing is fried, the chewiness of the dumpling wrapper with waxy starch and sodium tripolyphosphate added is higher than that of the dumpling wrappers in other formulas, it is indicated that the taste of the dumpling with added waxy starch, sodium tripolyphosphate, and fried dumpling stuffing is better.

Embodiment 11: SEM Image of Dumpling Wrappers in Different Formulas

Dumplings of different treatments are taken out according to different storage times, dumpling wrappers are taken, and the dumpling wrappers with different storage times are frozen in a refrigerator at −80° C. for 24 h, and freeze-dried in vacuum for 48 h, a freeze-dried sample is carefully broken with tweezers, and it is placed on a double-sided adhesive sample table while its cross-section is upward, and after ion sputtering gold plating, the microstructure is observed, and a photo is taken.

Figure 9A:
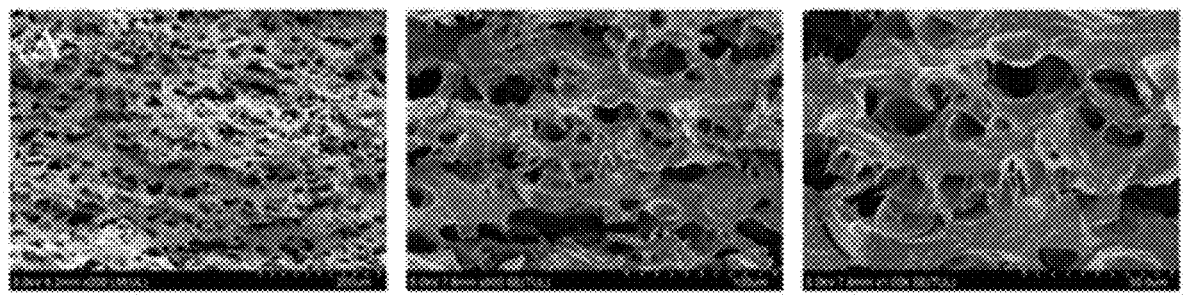
FIGS. 9A-9D show a scanning electron microscope (SEM) image of dumpling wrappers in the different formulas stored for 0 days.
Figure 9B:
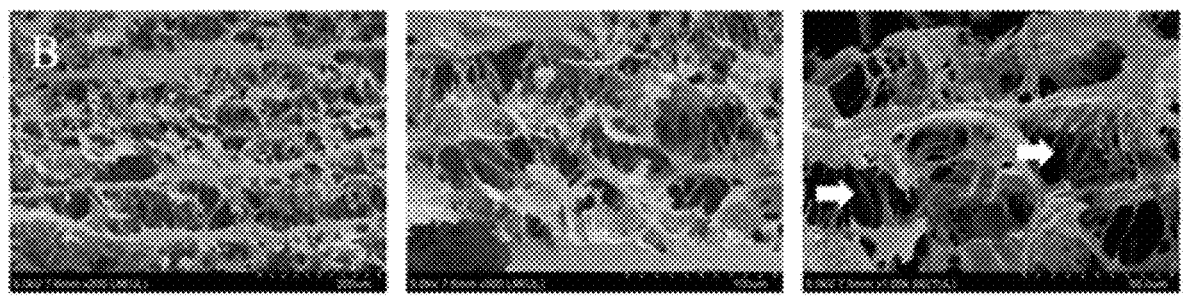
Figure 9C:
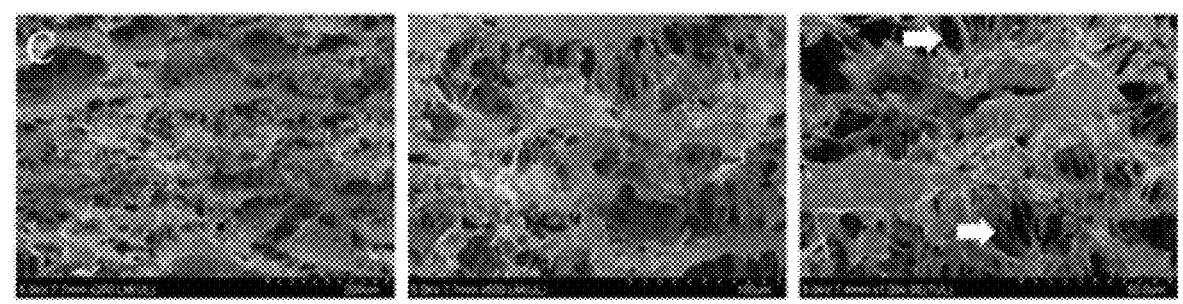
Figure 9D:
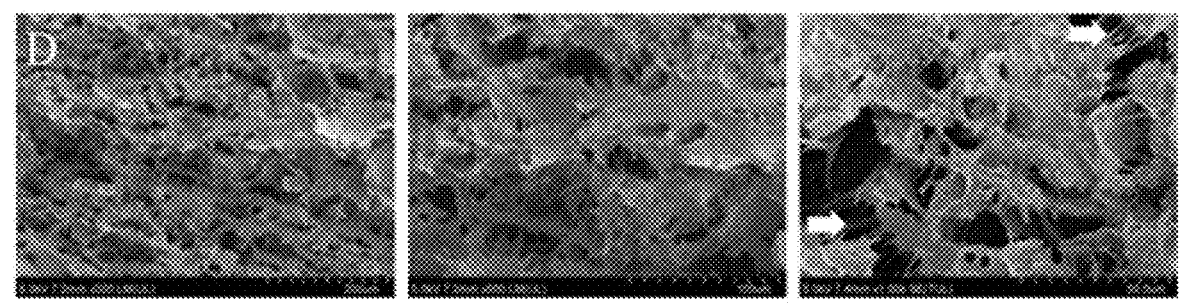
Figure 10A:
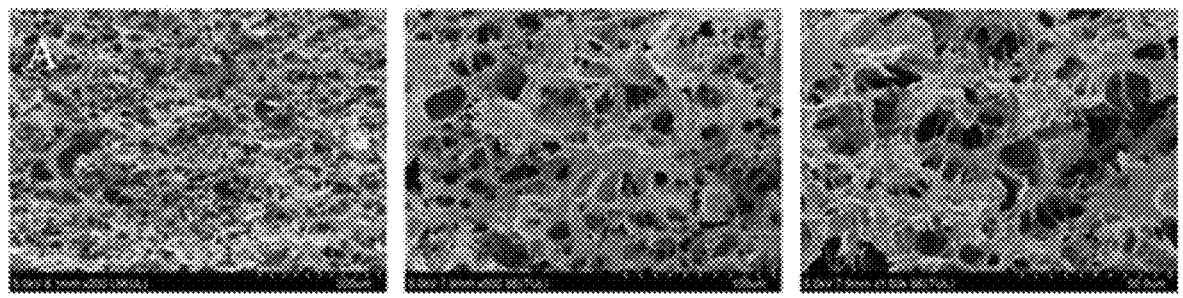
FIGS. 10A-10D show a scanning electron microscope (SEM) image of dumpling wrappers in the different formulas stored for 1 month.
Figure 10B:
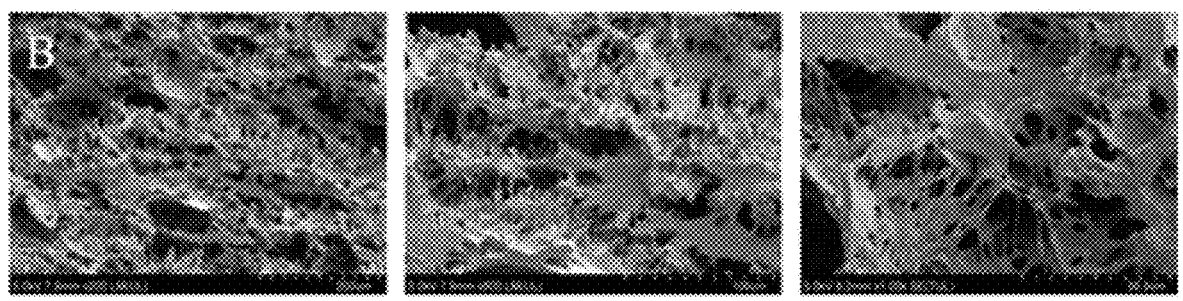
Figure 10C:
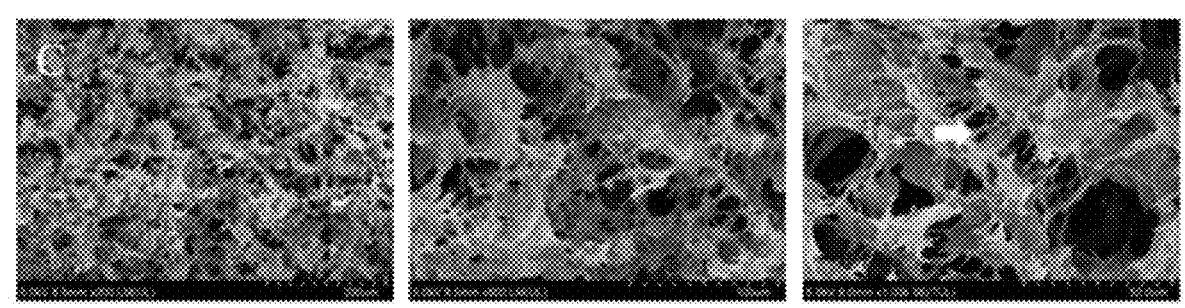
Figure 10D:
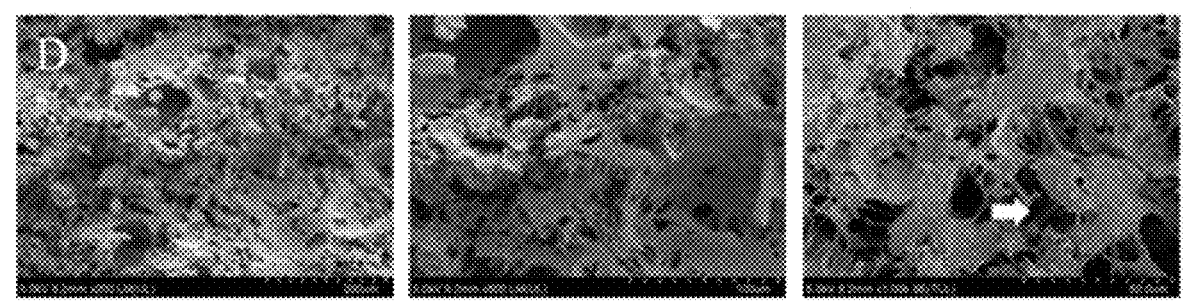

As shown in FIGS. 9A-9D, the addition of waxy starch and sodium tripolyphosphate, and fried dumpling stuffing may improve the stability of dumpling wrapper morphology and structure, as shown in FIG. 9A. As shown in FIGS. 9B-9D, in the cooling process after sterilization, due to short-term aging, the starch-protein network structure of the dumpling wrapper begins to collapse, and starch molecular chains wrapped in the network structure gradually emerge (as shown by an arrow). However, this phenomenon is not observed in the dumpling wrapper with waxy starch added, this may be because the addition of waxy starch reduces the degree of short-term aging.

As shown in FIGS. 10A-10D, a scanning electron microscope image of a dumpling wrapper stored for 1 M shows that with the extension of storage time, the network structure of the network dumpling wrapper partially disintegrates, and pores become large and uneven. The addition of waxy starch and sodium tripolyphosphate, and fried dumpling stuffing may improve the stability of dumpling wrapper morphology and structure, and there is no further enlargement of the pores during storage.

Figure 11:
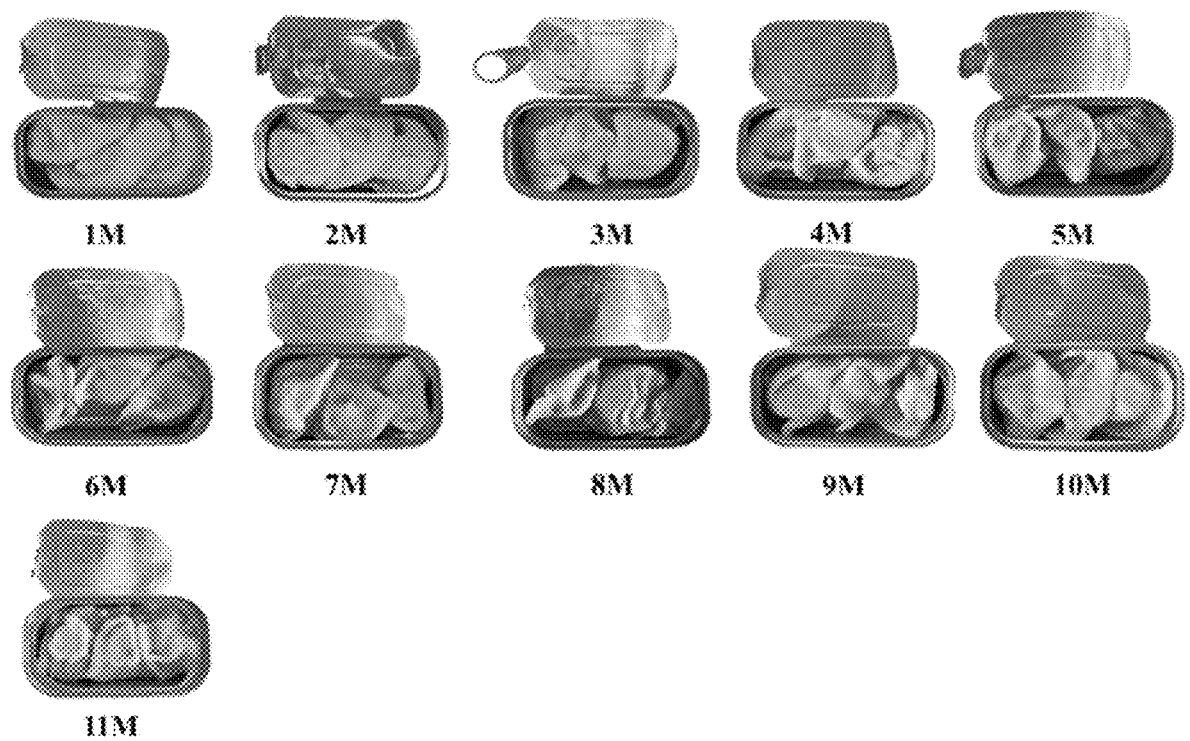
FIG. 11 shows photos of dumpling wrappers stored for 1-11 months (machine pressed wrapper+frying+waxy starch+sodium tripolyphosphate).

As shown in FIG. 11, the diagram of dumplings stored for different times shows that, as the extension of storage time, the dumplings do not rot and deteriorate, may still maintain the intact shape, and may be taken out easily.

Embodiment 12: Sensory Evaluation

After the product is stored for 11 months, dumplings made from the above embodiments are placed on a plate to observe its appearance and shape. Ten experienced sensory evaluators rate the appearance, color, stickiness, flavor, and taste of the dumplings. Specific scoring rules are shown in Table 2, and scoring results are recorded in Table 3.

TABLE 2

| Scoring rule | |
| --- | --- |
| Standard | Scoring |
| The shape is intact, the surface is smooth, and there is no leakage of stuffing | 16~20 |
| The shape is basically intact and there is no leakage of stuffing | 11~15 |
| Dumpling wrappers are adhered, and the surface is slightly damaged | 6~10 |
| The surface is seriously damaged, and it is unable to maintain the shape | <6 |
| The color is good | 21~25 |
| The color is average | 11~20 |
| The color is dim | <11 |
| Soft and chewy | 11~15 |
| Slightly stick to teeth | 6~10 |
| Stick to teeth | <6 |
| Good taste and odor, and no unpleasant odor | 21~25 |
| Average taste and odor, and no unpleasant odor | 11~20 |
| Unpleasant odor | <11 |
| Good taste | 11~15 |
| Average taste | 6~10 |
| Poor taste | <6 |

TABLE 3

| Sensory evaluation | | | | | | |
| --- | --- | --- | --- | --- | --- | --- |
| | appearance | color | stickiness | flavor | taste | total points |
| Embodiment 1 | 19 | 24 | 13 | 23 | 14 | 93 |
| Embodiment 2 | 19 | 23 | 14 | 22 | 14 | 92 |
| Embodiment 3 | 19 | 24 | 13 | 22 | 15 | 93 |
| The Stuffing is not fried | 16 | 20 | 11 | 20 | 11 | 78 |
| Sodium tripolyphosphate is not added to the dumpling wrapper | 14 | 20 | 10 | 19 | 9 | 72 |
| Waxy starch is not added to the dumpling wrapper | 12 | 19 | 9 | 19 | 9 | 68 |
| 0.2 g of sodium tripolyphosphate and 5% waxy starch are added to the dumpling wrapper, and fried | 15 | 21 | 11 | 20 | 10 | 77 |
| 0.3 g of sodium tripolyphosphate and 5% waxy starch are added to the dumpling wrapper, and fried | 15 | 22 | 12 | 20 | 12 | 81 |
| 0.4 g of sodium tripolyphosphate and 5% waxy starch are added to the dumpling wrapper, and fried | 17 | 22 | 12 | 20 | 12 | 83 |
| 2% waxy starch and 0.5 g of sodium tripolyphosphate are added to the dumpling wrapper, and fried | 16 | 21 | 12 | 21 | 12 | 82 |
| 3% waxy starch and 0.5 g of sodium tripolyphosphate are added to the dumpling wrapper, and fried | 16 | 22 | 13 | 22 | 12 | 85 |
| 4% waxy starch and 0.5 g of sodium tripolyphosphate are added to the dumpling wrapper, and fried | 17 | 23 | 13 | 23 | 14 | 90 |
| Ordinary dumpling | 12 | 15 | 6 | 15 | 7 | 55 |

According to the scoring results, the prepared sample has intact morphology, good taste, refreshing taste without roughness, no leakage of stuffing, good color, good taste and odor, and no unpleasant odor. It is indicated that the present disclosure may still be eaten after long-term storage, and the overall evaluation is high, the taste and flavor are maintained better. Although the appearance of the dumplings without the sodium tripolyphosphate and waxy starch added, and with the non-fried stuffing is not damaged, the taste is worse.

The process of the present disclosure reduces the degree of starch aging by adding the waxy starch, the addition of sodium tripolyphosphate promotes the binding between the gluten protein and starch, and the esterification enhances the binding force between the starch and gluten protein. The addition ratio of the two may maintain the structure of the dumpling wrapper after storage as much as possible and maintain the taste; however, due to the addition of waxy starch and sodium tripolyphosphate, the hardness of the dumpling wrapper dough is increased and the elasticity is reduced. Therefore, a mechanical rolling mode is needed for dough kneading and wrapper making. At the same time, the appropriate thickness of the dough wrapper also controls the diffusion of water in the stuffing and affects the taste. If the dough wrapper is too thin, it is easy to cause adhesion between the dumplings, and if the dough wrapper is too thick, it affects the taste.

Slightly fried dumpling stuffing may reduce the diffusion of water from the stuffing to the dumpling wrapper, assist in controlling the water content of the dumpling wrapper and prolong the storage time. In the pre-cooking process of the dumplings, its cooking degree should reach 50-60%, so that it is convenient for shaping of the dumpling product; and after steam exhaust, can sealing, and sterilization processes, the dumplings may be cooked, and the sterilization purpose is also achieved. The product may be stored at the normal temperature for a long time without the need for freeze-drying. The prepared canned dumplings do not require outer self-heating packaging, it is convenient to carry and transport, and the production cost is reduced. After the can is opened, it may be directly eaten, and it is verified that it may be stored at the normal temperature for at least 12 months with minimal impact on the taste.

Although the invention has been described in detail by general description and specific embodiment above, some modifications or improvements can be made on the basis of the invention, which is obvious to those skilled in the art. Therefore, these modifications or improvements made without departing from the spirit of the invention fall within the scope of the protection required by the invention.

What is claimed is:

1. A preparation method for a convenient and instant dumpling with a long normal-temperature shelf life, wherein: the preparation method comprises the following steps:
   (1) preparation of dough: weighing flour and waxy starch, mixing uniformly, adding a mixture of sodium tripolyphosphate and salt water, kneading into a dough, sealing the dough, wherein a weight ratio of flour:waxy starch:sodium tripolyphosphate:salt is (100-120):(5-10):(0.3-0.6):(1-3);
   (2) pressing of dough wrapper: pressing the dough into a dough wrapper with a thickness of 1.2-2.5 mm by a dough press;
   (3) preparation of dumpling wrapper: carving out a dumpling wrapper with a required size for later use;
   (4) preparation of stuffing: mincing meat required into minced meat, washing and treating a vegetable required, cutting and mixing slightly, after being mixing uniformly, mixing auxiliary materials required with the meat and the vegetables, kneading into an oval meat ball, frying in 110-140° C. oil for 20-40 s, and draining the oil for later use, wherein the auxiliary materials required for preparing the stuffing are at least one of: ginger powder or salt;
   (5) kneading of dumpling: wrapping the stuffing with the dumpling wrapper to prepare a dumpling;
   (6) pre-cooking: pre-cooking the dumplings for 1-2 min, and after being pre-cooked, pouring the dumplings in cold water;
   (7) canning: putting the dumplings into a metal can; and
   (8) sterilization and finished product: passing the can through an exhaust system, sealing the can, and sterilizing to obtain a finished product.

2. The preparation method as claimed in claim 1, wherein: the flour is wheat flour.

3. The preparation method as claimed in claim 2, wherein: the meat for preparing the stuffing is any one of pig lean meat, streaky meat, beef, mutton or fish; and the vegetable is any one of day lily, Chinese cabbage, or Chinese chive.

4. The preparation method as claimed in claim 2, wherein: the auxiliary materials required for preparing the stuffing further include thirteen-spice, shallot and chicken essence.

5. The preparation method as claimed in claim 2, wherein: in Step 7: the metal can is an aluminum alloy can or a tinplate can.

6. The preparation method as claimed in claim 2, wherein: in Step 8: after the can passes through an exhaust system, sealing the can, and sterilizing at 121° C.-130° C. for 15-25 min to obtain the finished product.

7. The preparation method as claimed in claim 1, wherein: the meat for preparing the stuffing is any one of pig lean meat, streaky meat, beef, mutton or fish; and the vegetable is any one of day lily, Chinese cabbage, or Chinese chive.

8. The preparation method as claimed in claim 1, wherein: the auxiliary materials required for preparing the stuffing further include thirteen-spice, shallot and chicken essence.

9. The preparation method as claimed in claim 1, wherein: in Step 7: the metal can is an aluminum alloy can or a tinplate can.

10. The preparation method as claimed in claim 1, wherein: in Step 8: after the can passes through an exhaust system, sealing the can, and sterilizing at 121° C.-130° C. for 15-25 min to obtain the finished product.

* * * * *